(12) United States Patent
Zhang et al.

(10) Patent No.: US 12,038,589 B2
(45) Date of Patent: Jul. 16, 2024

(54) HEAD-MOUNTED VIRTUAL REALITY APPARATUS

(71) Applicant: Beijing Zitiao Network Technology Co., Ltd., Beijing (CN)

(72) Inventors: An Zhang, Beijing (CN); Yi Lai, Beijing (CN); Guanghui Liu, Beijing (CN); Yuluo Wen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/465,694

(22) Filed: Sep. 12, 2023

(65) Prior Publication Data

US 2024/0103286 A1 Mar. 28, 2024

(30) Foreign Application Priority Data

Sep. 23, 2022 (CN) .......................... 202211168178.8

(51) Int. Cl.
*G09G 5/38* (2006.01)
*G02B 27/01* (2006.01)

(52) U.S. Cl.
CPC .............................. *G02B 27/0176* (2013.01)

(58) Field of Classification Search
CPC . G02B 27/0176; G02B 27/017; H04N 13/332
See application file for complete search history.

(56) References Cited

U.S. PATENT DOCUMENTS 10,571,691 B1 * 2/2020 Yee .................... G02B 27/0176

FOREIGN PATENT DOCUMENTS

| CN | 206301077 U | 7/2017 |
|---|---|---|
| CN | 207516643 U | 6/2018 |
| CN | 213124647 U | 5/2021 |

* cited by examiner

*Primary Examiner* — Abbas I Abdulselam
(74) *Attorney, Agent, or Firm* — Alleman Hall & Tuttle LLP

(57) ABSTRACT

The present disclosure provides a head-mounted virtual reality apparatus. The head-mounted virtual reality apparatus includes a first strap and a second strap, a second end of the first strap and a second end of the second strap are both laminated within a housing, a portion of the wire is gathered on a first side of the housing, and the second end of the second strap has an open slot that forms a second chute, the open slot is opposite to the wire and the open slot is in a direction consistent with a direction of movement of the second strap.

20 Claims, 4 Drawing Sheets

HEAD-MOUNTED VIRTUAL REALITY APPARATUS

CROSS-REFERENCE TO RELATED APPLICATION

This application claims priority to Chinese Patent Application No. 202211168178.8, filed on Sep. 23, 2022, which is hereby incorporated by reference in its entirety.

TECHNICAL FIELD

The present disclosure relates to the technical field of display devices, and in particular to a head-mounted virtual reality apparatus.

BACKGROUND

With the progress and development of display technology, a head-mounted virtual reality apparatus is gradually applied to games, social activities and other scenarios. The head-mounted virtual reality apparatus, which utilizes the principle of VR, can realize an integrated and interactive three-dimensional dynamic vision mirror of a virtual environment and simulation of an entity behavior, so that a user is immersed in an virtual reality environment and produces a better sensory experience.

The head-mounted virtual reality apparatus includes a display device at a front end, a battery compartment assembly at a rear end, a strap assembly located between both of them and a strap adjustment mechanism, where the battery compartment assembly includes a housing and a battery assembly located within the housing, the strap assembly includes a first strap and a second strap, which are provided at left and right, and one ends of the first strap and the second strap are each connected to a display device, the other ends of both them are connected to the strap adjustment mechanism, the strap adjustment mechanism is capable of adjusting a length of the strap assembly. A wire is integrated within the first strap, a first end of the wire is connected to the display device, and a second end of the wire is used to connect with the battery assembly and is capable of supplying a signal and an operating current to the display device, a length of the second end of the wire has a margin, which is gathered in the housing.

However, when looseness or tightness of the strap assembly is adjusted using the strap adjustment mechanism, the second strap meets the wire and rubs against the wire, resulting in damage to the wire and thus reduced lifespan of the wire.

SUMMARY

In view of the above problem, an embodiment of the present disclosure provides a head-mounted virtual reality apparatus, and when looseness or tightness of a strap assembly is adjusted using a strap adjustment mechanism, it is possible to avoid a first strap and a second strap from meeting, thereby reducing a risk of a wire being subjected to friction and improving a service life of the wire.

To achieve the above object, an embodiment of the present disclosure provides the following technical solution:

The embodiment of the present disclosure provides a head-mounted virtual reality apparatus including: a display device, a battery compartment assembly, a first strap, a second strap, a wire, and a strap adjustment mechanism; the battery compartment assembly includes a housing, the strap adjustment mechanism is provided in the housing, the strap adjustment mechanism includes a drive gear, and a first rack and a second rack, both of which are meshed with the drive gear and opposite to each other; a first end of the first strap and a first end of the second strap are connected to both sides of the display device, respectively; a second end of the first strap and a second end of the second strap are laminated within the housing; the second end of the first strap has a first chute, and the first rack is provided on a side wall of the first chute; the wire is used to connect the display device and part of the wire is gathered on a first side of the housing; the second end of the second strap has a second chute, the second chute has an open slot opposite to the wire, the open slot extends in a direction consistent with a direction that the second chute extends; the second rack is provided on a side wall of the open slot, and when the drive gear rotates, the second end of the second strap will not meet the wire on the first side of the housing since the wire is located within the open slot.

In the head-mounted virtual reality apparatus provided in the embodiment of the present disclosure, the second end of the first strap and the second end of the second strap are both laminated within the housing, a portion of the wire is gathered on the first side of the housing, and the second end of the second strap has the open slot that forms the second chute, and the wire can be accommodated within the second chute, so the wire will not meet the second strap, thereby avoiding the wire from interfering with the second strap.

Compared to a related technical solution where when lengths of the first strap and the second strap outside the housing are adjusted utilizing the strap adjustment mechanism, the second end of the second strap moves toward an area where the wire is located and the end of the second strap interferes with the wire, in the embodiment of the present disclosure, the second strap has an open slot, and when the second end of the second strap is moved toward the area where the wire is located, the wire can be accommodated in the open slot, it is possible to avoid the end of the second strap from interfering with the wire, thereby avoiding the wire from being subjected to friction and improving a service life of the wire.

In an embodiment, the drive gear is centrally provided within the housing; the second end of the first strap is located on a second side of the drive gear, the second end of the second strap is located on a first side of the drive gear, and the second ends of both them have a variable overlapping area.

In an embodiment, the housing is provided with a first limiting structure and a second limiting structure; the first strap is provided with a first limiting portion, and when the first strap is configured such that the first limiting portion abuts against with the first limiting structure, the first strap is located at its longest length; the second strap is provided with a second limiting portion, and when the second strap is configured such that the second limiting portion abuts against the second limiting structure, the second strap is located at its longest length. In this way, the housing in the embodiment of the present disclosure being provided with the first limiting structure and the second limiting structure are capable of indicating limit positions of the maximum lengths of the first strap and the second strap, improving a user's experience.

In an embodiment, the first limiting structure is a limiting baffle provided in the housing; along a direction of extension of the first chute, the limiting baffle is provided in the first chute, located on the second side of the drive gear and spaced apart from the drive gear.

In an embodiment, the second end of the first strap is provided with a through hole along its length direction to form the first chute; a portion between the first chute and the second end of the first strap forms the first limiting portion, and the first limiting portion is located on the second side of the drive gear.

In an embodiment, the through hole is a rectangular hole; the through hole includes a first side wall, a second side wall, a third side wall and a fourth side wall opposite to each other, where the first side wall and the second side wall are opposite to each other along a length direction of the first strap, and the wire can be located between the first side wall and the second side wall; the first rack is located on the first side wall or the second side wall, and the third side wall is opposite to the fourth side wall and connected between the first side wall and the second side wall, where the fourth side wall is located on the second side of the drive gear and forms the first limiting portion.

In an embodiment, the second strap includes two strips forming the open slot; the two strips are parallel and opposite to each other, the wire can be located between the two strips, and the second rack is located on one of the strips; each strip is provided with a limiting pillar to form the second limiting portion.

In an embodiment, the housing is provided with a limiting lug to form the second limiting structure; the limiting lug is located in a path of movement of the second strap, and the limiting lug is provided with a limiting groove which cooperates with the limiting pillar.

In an embodiment, the housing is provided with a guide surface opposite to the strips respectively; one end of the limiting pillar is connected with the strip, and the other end of the limiting pillar extends to the guide surface and slides along the guide surface. In this way, the above two strips slide along the guide surface, which enables the two strips to remain parallel during movement, so as to reduce a transmission resistance between the drive gear and the second rack and enhance a mechanical transmission effect.

In an embodiment, the battery compartment assembly further includes a battery assembly; the housing has a battery compartment and the limiting lug is provided on a side wall of the battery compartment; the battery assembly is provided in the battery compartment and forms an accommodating cavity with a bottom wall of the battery compartment; the first limiting structure and the second limiting structure are both provided in the accommodating cavity.

In an embodiment, the battery assembly includes a main plate and two oppositely provided a guide rib; one side of the guide rib is attached to the main plate, the other side thereof extends toward the bottom wall of the battery compartment, and a side surface of the guide rib forms a guide surface, the guide surface is fitted to the limiting pillar; the guide rib is provided with a via hole that cooperates with the limiting lug, and part of the limiting lug passes through the via hole and abuts against the limiting pillar.

In an embodiment, the battery compartment assembly further includes a battery cover and a knob; the battery cover is covered on the housing and seals the battery compartment; the knob is rotationally connected to the battery cover and an end of the drive gear passes through the battery assembly and is connected to the knob. In this way, the knob is rotationally connected to the battery cover, and the lengths of the first strap and the second strap located outside the housing can be easily adjusted by rotating the knob, improving the user's experience.

In an embodiment, both sides of the housing are provided with a first opening and a second opening, respectively; the second end of the first strap and the second end of the second strap extend through the first opening and the second opening, respectively, into the accommodating cavity, and are connected with a portion of the drive gear located within the accommodating cavity.

In an embodiment, part of the wire is integrated within the first strap and part of the wire is exposed outside of the first strap; a first end of the wire is connected with the display device, and a second end of the wire is provided in a curled form in the accommodating cavity, and the second end of the wire is connected with a side of the battery assembly near the battery cover. With such setting, the wire is integrated into the first strap, which prevents damage to the wire, and thus improves the service life of the wire.

In an embodiment, the second strap is provided above the first strap and slides relative to the first strap. With such setting, an upper part of the second strap has a large arrangement space, which can increase a bending radius of the wire, and can avoid the wire from being broken due to a large degree of bending, thereby improving the service life of the wire.

BRIEF DESCRIPTION OF THE DRAWINGS

To clearly illustrate the technical solutions in embodiments of the present disclosure or in prior art. The following is a brief description of the figures to be used in description of the embodiments or the prior art. Obviously, the figures in the following description are some embodiments of the present disclosure. For the ordinary skilled in the art, other figures can be obtained from these figures without creative work.

Figure 1:
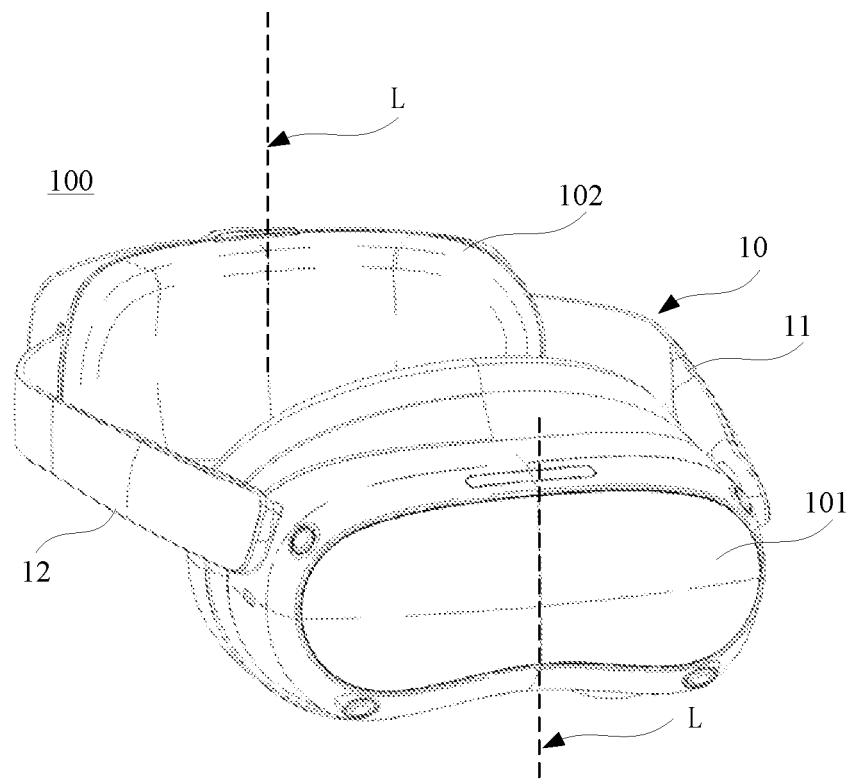
FIG. 1 is a schematic diagram of a head-mounted virtual reality apparatus provided in an embodiment of the present disclosure at a first angle.

Illustration of Reference Signs:
10—strap assembly;
11—first strap; 111—first chute; 112—first limiting portion;
12—second strap; 121—second chute; 122—second limiting portion; 123—strip;
20—housing;
21—battery compartment;
211—first limiting structure; 212—second limiting structure;

30—battery assembly;
31—main plate; 32—guide rib; 321—guide surface;
40—battery cover;
50—wire;
60—strap adjustment mechanism;
61—drive gear;
62—first rack;
63—second rack;
70—knob;
100—head-mounted virtual reality apparatus;
101—display device;
102—battery compartment assembly.

DETAILED DESCRIPTION OF THE EMBODIMENTS

As described in the background section, the head-mounted virtual reality apparatus in the related technology has a technical problem of a wire wearing out due to friction between the wire and a strap assembly when a strap adjustment mechanism is utilized to adjust tightness or looseness of the strap assembly. The inventor found after research that the reason for such a problem is that the head-mounted virtual reality apparatus includes the strap adjustment mechanism, a display device for connecting to a front end and the strap assembly for the battery compartment assembly at a rear end, where the battery compartment assembly includes a housing and the battery assembly located within the housing, the strap assembly includes a first strap and a second strap, which are provided at left and right, and one ends of the first strap and the second strap are each connected to the display device at the front end, the other ends of both them are connected to the strap adjustment mechanism, the strap adjustment mechanism is capable of adjusting a length of the strap assembly. The wire is integrated within the first strap, a first end of the wire is connected to the display device, and a second end of the wire is used to connect with the battery assembly, and capable of supplying a signal and an operating current to the display device, a length of the second end of the wire has a margin, which is gathered in the housing.

However, the first strap and the second strap are laminated, and the second end of the second strap is opposite to the wire, and when the lengths of the first strap and the second strap outside the housing are adjusted utilizing the strap adjustment mechanism, the second end of the second strap moves toward an area where the wire is located, and the end of the second strap collides with the wire, thereby rubbing against the wire and resulting in abrasion of the wire.

In view of the above technical problem, embodiments of the present disclosure provide a head-mounted virtual reality apparatus, where an open slot is provided at the second end of the second strap, and when the second end of the second strap is moved toward the area where the wire is located, the wire can be accommodated in the open slot, and thus the end of the second strap can be prevented from interfering with the wire, thereby avoiding the wire from being subjected to friction and improving a service life of the wire.

In order to make the above purposes, features and advantages of the embodiments of the present disclosure more apparent and understandable, the technical solutions in the embodiments of the present disclosure will be clearly and completely described below in conjunction with the figures in the embodiments of the present disclosure. Obviously, the described embodiments are only some, but not all of the embodiments of the present disclosure. Based on the embodiments of the present disclosure, all other embodiments obtained by the ordinary skilled in the art without creative effort are within the scope of protection of the present disclosure.

For convenience of illustration of the embodiments of the present disclosure, a dashed line L as shown in FIG. 1 is taken as a center line, a portion located on left side of the dashed line L in FIG. 1 can be defined as a first side of the head-mounted virtual reality apparatus, a portion located on right side of the dashed line L can be defined as a second side of the head-mounted virtual reality apparatus, and a front end and a rear end of the head-mounted virtual reality apparatus can be defined along directions indicated by the arrows.

Figure 2:
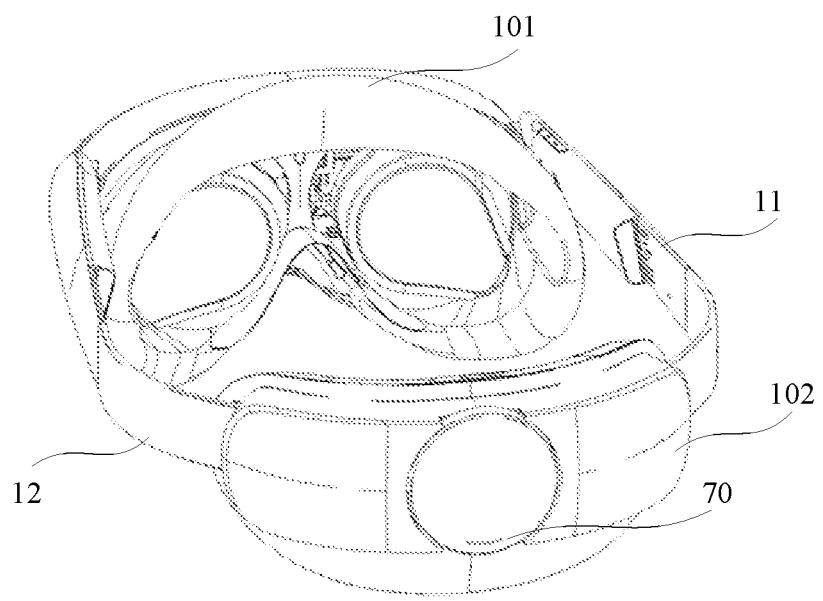
FIG. 2 is a schematic diagram of a head-mounted virtual reality apparatus provided in an embodiment of the present disclosure at a second angle.

As shown in FIGS. 1 and 2, the head-mounted virtual reality apparatus 100 provided by the embodiment of the present disclosure includes: a display device 101, a battery compartment assembly 102, a strap assembly 10, a wire 50, and a strap adjustment mechanism 60, etc., where the display device 101 is located at the front end of the apparatus as a whole and the battery compartment assembly 102 is located at the rear end of the apparatus as a whole. The battery compartment assembly 102 includes a housing 20 and a battery assembly 30 located within the housing 20, where the strap adjustment mechanism 60 is installed within the housing 20 so as to adjust a length of the strap assembly 10.

The strap assembly 10 is provided between the battery compartment assembly 102 and the display device 101, the strap assembly 10 includes a first strap 11 and a second strap 12, and a first end of the first strap 11 is connected with a first side of the display device 101, a second end of the first strap 11 extends into the housing 20 and is connected with the strap adjustment mechanism 60 provided within the housing 20; a first end of the second strap 12 is connected with a second side of the display device 101, and a second end of the second strap 12 extends into the housing 20 and is connected with a strap adjustment mechanism provided within the housing 20.

When a user is to use the above head-mounted virtual reality apparatus 100, since different users have different head circumferences, it is necessary to adjust the length of the strap assembly 10 by using the strap adjustment mechanism 60, ensuring that the strap assembly 10 fits to the head so that the above head-mounted virtual reality apparatus 100 may be applied to different users and enhances its applicability. After wearing, the battery compartment assembly 102 is located at the back of the user's head and the display device 101 is located on the user's face and in front of the user's eyes.

Figure 3:
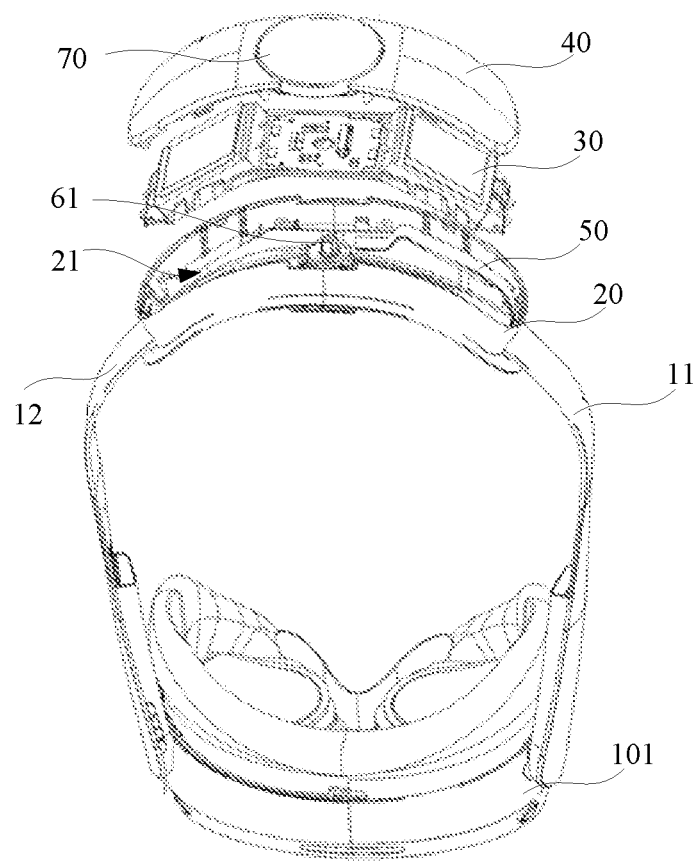
FIG. 3 is an exploded schematic diagram of a head-mounted virtual reality apparatus provided in an embodiment of the present disclosure.

As shown in FIG. 3, the battery compartment assembly 102 provided by an embodiment of the present disclosure includes not only the housing 20 and the battery assembly 30, but also a battery cover 40, where the housing 20 is provided with a battery compartment 21 for installing the battery assembly 30, the battery assembly 30 is installed within the battery compartment 21 and fastened, and an accommodating cavity is formed between the battery assembly 30 and a bottom wall of the battery compartment 21. The battery cover 40 is removably connected to the housing 20 and is capable of sealing an entire opening of the battery compartment 21. In this case, the battery assembly 30 is located between the battery cover 40 and a bottom wall of the housing 20, and the battery cover 40 can protect the battery assembly 30.

A first opening and a second opening are provided on a side wall of the housing 20, the first opening is located on a first side of the housing 20, and the first opening is provided in cooperation with the second end of the first strap 11 so that the second end of the first strap 11 extends through the first opening into the above accommodating cavity. Similarly, the second opening is located on a second side of the housing 20 and the second opening is provided in cooperation with the second strap 12 so that the second end of the second strap 12 extends through the second opening into the above accommodating cavity, and the second opening is opposite to the first opening.

Furthermore, the battery compartment assembly 102 further includes a knob 70, the knob 70 is rotationally connected to the battery cover 40, and the knob 70 is connected with the strap adjustment mechanism 60. Specifically, the strap adjustment mechanism 60 includes a drive gear 61, and a first rack 62 and a second rack 63, both of which are meshed with the drive gear 61, where the drive gear 61 is in a cylindrical structure as a whole, an outer peripheral surface of the drive gear 61 is provided with transmission teeth extending in its axial direction, and the drive gear 61 meshes with the first rack 62 and the second rack 63 respectively through the transmission teeth.

An end of the drive gear 61 passes through the battery assembly 30 and is rotationally connected to the knob 70, and rotation of the knob 70 can drive the drive gear 61 to rotate so that the first rack 62 and the second rack 63 can be moved. For example, by controlling a rotational direction of the knob 70, the first rack 62 and the second rack 63 can be moved back-to-back or in opposite directions.

Exemplarily, the drive gear 61 can be centrally provided within the housing 20, that is, the drive gear 61 may be centrally provided within the accommodating cavity. The second end of the first strap 11 is located on the second side of the drive gear 61, that is, the second end of the first strap 11 can extend to the second side of the housing 20. The second end of the second strap 12 is located on the first side of the drive gear 61, that is, the second end of the second strap 12 can extend to the first side of the housing 20. In this way, the second end of the first strap 11 and the second end of the second strap 12 have an overlapping area, and the drive gear 61 may be located in the overlapping area of both them. When the first rack and the second rack are moving, the overlapping area is variable, thereby increasing an overall adjustable length of the strap assembly 10.

Figure 4:
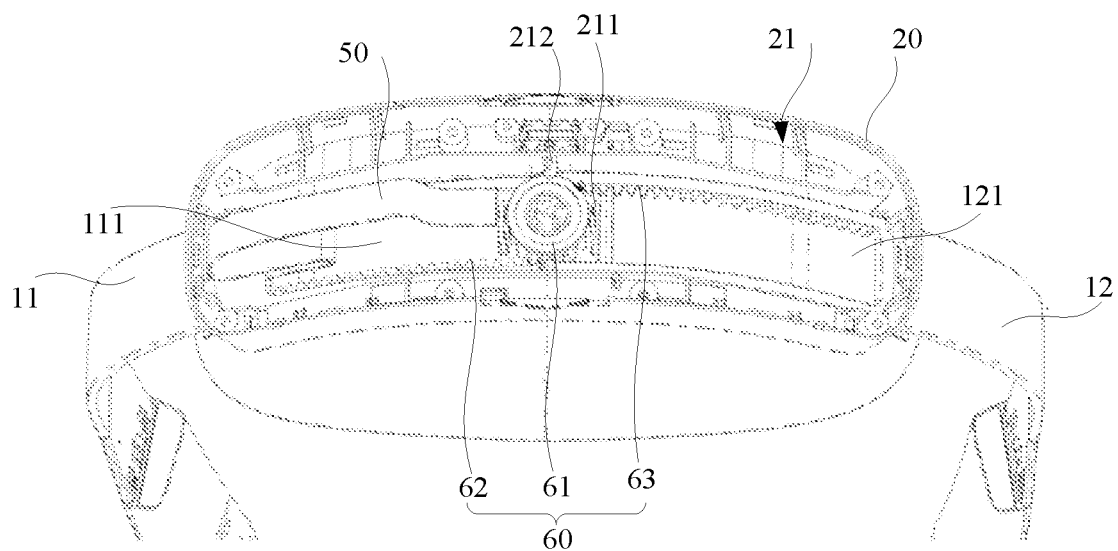
FIG. 4 is a first schematic diagram of a first strap and a second strap connection with a strap adjustment mechanism provided in an embodiment of the present disclosure.
Figure 5:
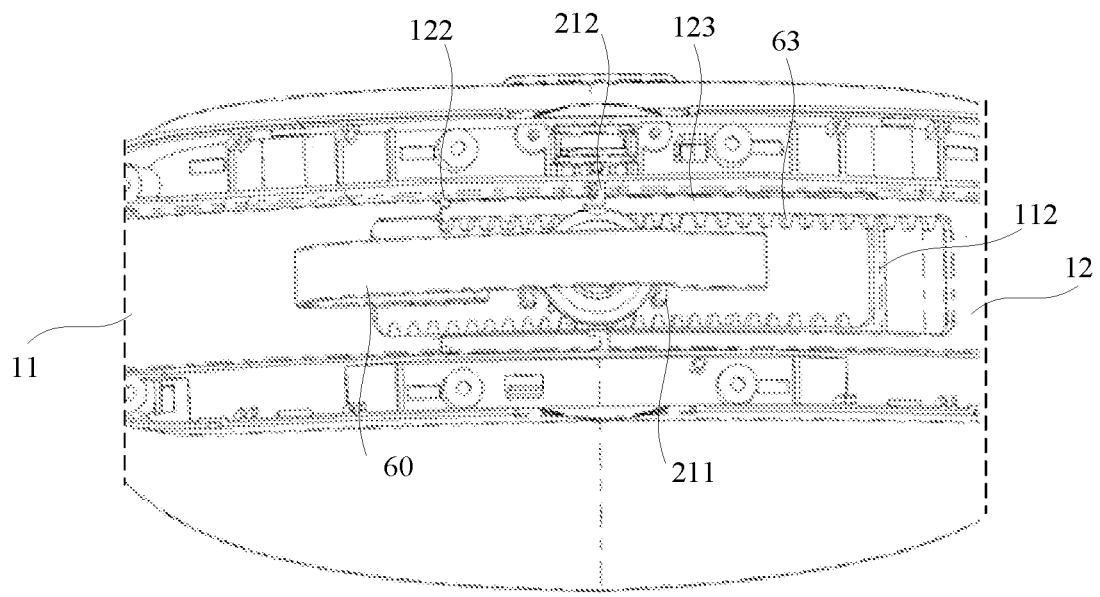
FIG. 5 is a second schematic diagram of a first strap and a second strap connection with a strap adjustment mechanism provided in an embodiment of the present disclosure.

As shown in FIGS. 4 and 5, the second end of the first strap 11 in the embodiment of the present disclosure embodiment is located within the accommodating cavity, and is in drive connection with the drive gear 61. The second end of the first strap 11 is provided with a first chute 111, the first chute 111 can be an open slot or a through hole formed on the first strap 11, and an extension direction of the open slot or the through hole is consistent with a length adjustment direction of the first strap 11. The first rack 62 is provided on an inner wall of the first chute 111, an extension direction of the first rack 62 is consistent with the length adjustment direction of the first strap 11.

The drive gear 61 is located within the first chute 111, a portion of the first chute 111 is located on the first side of the housing 20, and a portion of the first chute 111 is located on the second side of the housing 20, that is, a portion of the first chute 111 can extend to the second (right) side of the drive gear 61, and the first rack 62 meshes with the drive gear 61.

The wire 50 provided in the embodiment of the present disclosure is used to connect the battery assembly 30 and the display device 101. For example, the wire 50 can be a power wire, a signal wire, etc., and provides a signal as well as an operating current to the display device 101. Where the wire 50 are provided on the first strap 11, for example the wire 50 are integrally provided within the first strap 11. In this way, the first strap 11 may provide protection for the wire 50, preventing damage to the wire 50 and further improving the service life of the wire 50.

A first end of the wire 50 is connected to the display device 101, a second end of the wire 50 is exposed from the second end of the first strap 11, and the exposed portion of the wire 50 can be gathered in a curled form on the first side of the housing 20 and located within the first chute 111.

For example, the wire 50 is provided at a middle position of the first strap 11, the portion exposed from the first strap 11 can be accommodated within the first chute 111, the wire 50 has a margin to accommodate a change in the length of the first strap 11, and thus the wire 50 is provided in a curled form in the accommodating cavity, and is located on the first side of the drive gear 61.

Furthermore, the second end of the wire 50 is connected to the battery assembly 30; the second end of the wire 50 can be wound to a surface of the battery assembly 30 near the battery cover 40, and connected with a device on the battery assembly 30; in this way, the layout of the battery assembly 30 and the wire 50 can be optimized to reduce a size of the entire housing 20, which is conducive to the miniaturization of the apparatus.

Similarly, the second end of the second strap 12 is located within the accommodating cavity and is in drive connection with the drive gear 61. A second chute 121 is provided at the second end of the second strap 12, the second chute 121 can be an open slot formed on the second strap 12, an extension direction of the open slot is consistent with as a length adjustment direction of the second strap 12, and an opening of the open slot are oriented toward the wire 50, that is, the open slot may be provided opposite to the wire 50. The wire 50 and the second strap 12 will not meet since the wire 50 is accommodated within the open slot, thereby avoiding a phenomenon of interference between the wire 50 and the second strap 12 when the wire 50 meets the second strap 12.

The drive gear 61 is located within the second chute 121, a portion of the second chute 121 is located on the first side of the housing 20, and a portion of the second chute 121 is located on the second side of the housing 20, that is, a portion of the second chute 121 can extend to the first (left) side of the drive gear 61; the second rack 63 is provided on an inner wall of the second chute 121, the second rack 63 meshes with the drive gear 61, and the second rack 63 is opposite to the first rack 62, that is, the first rack 62 and the second rack 63 are each meshed with the transmission teeth of the drive gear 61. When the drive gear 61 is rotated, the first rack 62 and the second rack 63 move in opposite directions.

The second end of the first strap 11 and the second end of the second strap 12 in the embodiment of the present disclosure are in different planes, that is, the second end of the first strap 11 and the second end of the second strap 12 are laminated within the accommodating cavity. For example, the second end of the first strap 11 is provided above the second end of the second strap 12, and the first strap 11 and the second strap 12 may slide relative to each other, the wire 50 in an embodiment of the present disclosure is integrally provided on the first strap 11, which allows the second end of the first strap 11 to be provided below the second end of the second strap 12.

In this way, an accommodating space between the first strap 11 and the battery assembly 30 is larger, which is more conducive to arranging the portion of the wire 50 exposed from the first strap 11, increasing a bending radius of the wire 50, and thus preventing the wire 50 from breaking due to a large degree of bending, thereby enhancing the service life of the wire 50.

In the embodiment of the present disclosure, when the strap adjustment mechanism 60 is utilized to adjust the tightness or looseness of the strap assembly 10, an adjustment process is described as follows:

When the length of the strap assembly 10 needs to be increased, the drive gear 61 is rotated so that the second end of the first strap 11 moves from the second side towards the first side (defined as a first direction in embodiments of the present disclosure); correspondingly, the second strap 12 moves in a direction opposite to a direction of movement of the first strap 11, the second end of the second strap 12 moves from the first side towards the second side (defined as a second direction in embodiments of the present disclosure). At this time an adjustable length of the first strap 11 is increased and an adjustable length of the second strap 12 is increased.

Conversely, when the length of the strap assembly 10 needs to be reduced, the drive gear 61 is rotated so that the second end of the first strap 11 moves from the first side toward the second side (second direction); correspondingly, the second strap 12 moves in a direction opposite to a direction of movement of the first strap 11, the second end of the second strap 12 moves from the second side towards the first side (first direction). At this time, an adjustable length of the first strap 11 becomes smaller and an adjustable length of the second strap 12 becomes smaller.

However, when the second end of the second strap 12 will not meet the wire 50 on the first side of the housing 20, since the wire 50 may be accommodated within the second chute 121, thereby preventing the wire 50 from interfering with the second strap 12 and resulting in friction damage to the wire 50.

Compared with the existing technical solution where when the lengths of the first strap 11 and the second strap 12 outside of the housing 20 are adjusted using the strap adjustment mechanism 60, the first strap 11 and the second strap 12 move back-to-back and the end of the second strap 12 interferes with the wire 50, the second strap 12 in the embodiments of the present disclosure has an open slot, and when the second end of the second strap 12 moves toward an area where the wire 50 is located, and will not meet the wire 50 since the wire 50 may be accommodated within the open slot, thereby preventing the end of the second strap 12 from interfering with the wire 50, and thus prevents the wire 50 from being subjected to friction, thereby improving the service life of the wire 50.

Figure 6:
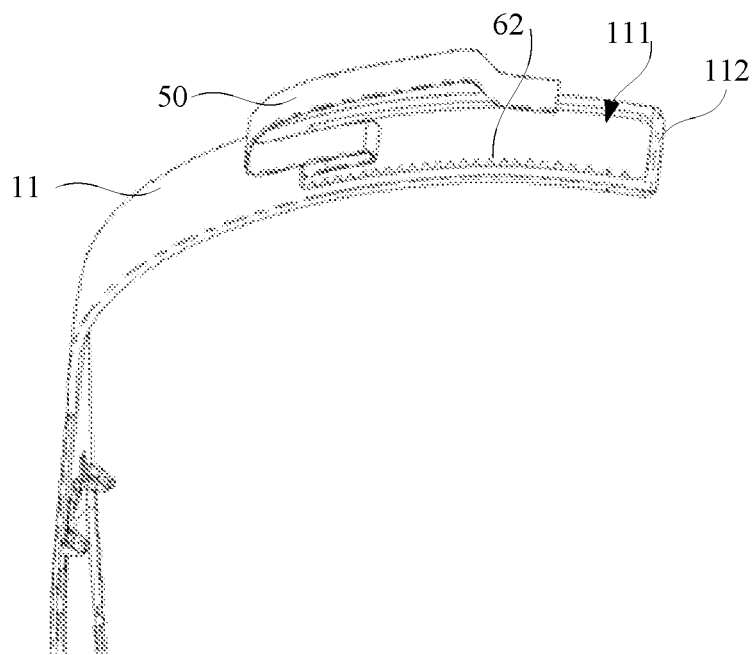
FIG. 6 is a schematic diagram of an arrangement of a wire at a second end of a first strap provided in an embodiment of the present disclosure.
Figure 7:
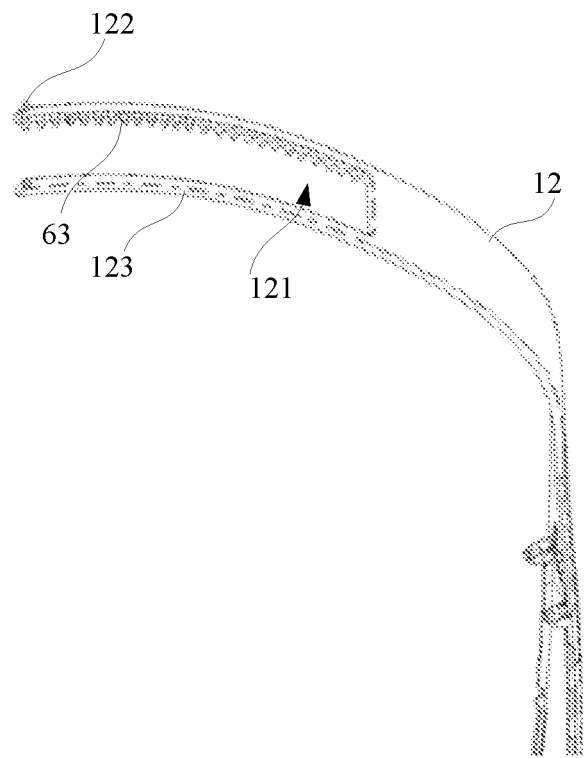
FIG. 7 is a schematic structural diagram of a second end of a second strap provided in an embodiment of the present disclosure.

As shown in FIGS. 6 and 7, on the basis of the above embodiment, the housing 20 in the embodiment of the present disclosure is further provided with a first limiting structure 211 and a second limiting structure 212, the first limiting structure 211 is used to restrict a maximum adjustable length of the first strap 11, and similarly, the second limiting structure 212 is used to restrict a maximum adjustable length of the second strap 12.

The first strap 11 is provided with a first limiting portion 112, the first limiting portion 112 cooperates with the first limiting structure 211, and the first limiting structure 211 is provided in a movement path of the first strap 11. When the first limiting portion 112 abuts against the first limiting structure 211, the first strap 11 is located at its longest length, that is, the first strap 11 has a longest length that is outside the housing 20.

Similarly, the second strap 12 is provided with a second limiting portion 122, the second limiting portion 122 is in cooperation with the second limiting structure 212, the second limiting structure 212 is provided in a path of movement of the second strap 12. When the second limiting portion 122 abuts against the second limiting structure 212, the second strap 12 is located at its longest length, that is, the second strap 12 has a longest length that is outside the housing 20.

It should be noted that, when the above first limiting structure 211 abuts against the first limiting portion 112, the first rack 62 remains meshed with the drive gear 61. Correspondingly, when the above second limiting structure 212 abuts against the second limiting portion 122, the second rack 63 remains meshed with the drive gear 61. Furthermore, in the embodiment of the present disclosure, minimum adjustable lengths of the first strap 11 and the second strap 12 can be achieved by reasonably designing an layout space of the accommodating cavity, and the lengths and positions of the first rack 62 and the second rack 63, and this will not be described in the embodiment again.

On the basis of the above embodiment, the first limiting portion 112 in embodiments of the present disclosure may be formed at second end of the first strap 11 while forming the first chute 111. As shown in FIG. 6, the second end of the first strap 11 is provided with a through hole along its length direction, and an extension direction of the through hole is consistent with a length direction of the first strap 11, so as to form the first chute 111 at the second end of the first strap 11. A portion between the first chute 111 and the second end of the first strap 11 forms the first limiting portion 112, and the first limiting portion 112 is located on the second side of the drive gear 61, that is, the drive gear 61 is located within the through hole.

Exemplarily, the through hole provided at the second end of the first strap 11 in the embodiment of the present disclosure can be a rectangular hole, the through hole includes a first side wall and a second side wall opposite to each other, and the first side wall and the second side wall are long side walls, that is, extension directions of the first side wall and the second side wall are consistent with a length direction of the through hole.

Furthermore, the first rack 62 is selectively provided on the first side wall or the second side wall. For example, the first rack 62 may be provided on the first side wall and both of them may be an integral structure, that is, the first rack 62 is formed directly on the first side wall of the through hole; in this way, the reliability of the connection between the first rack 62 and the first strap 11 can be improved.

The through hole further includes a third side wall and a fourth side wall, which are provided between the first side wall and the second side wall. The third side wall and the fourth side wall are provided opposite to each other, and the third side wall and the fourth side wall are used to connect the first side wall and the second side wall so as to enclose to form a closed rectangular hole. The third side wall and the fourth side wall are short side walls, that is, extension directions of the third side wall and the fourth side wall are consistent with a width direction of the through hole, and the width of the through hole needs to be wider than a width of the wire 50 so that the wire 50 can pass through and be out of a wall surface of the third side wall and is located within the through hole.

The fourth side wall is located on the second side of the drive gear 61, and a portion between the fourth side wall and an edge of the second end of the second strap 12 forms the first limiting portion 112, the first limiting portion 112 is located on the second side of the drive gear 61 and is not in contact with the drive gear 61. In this way, the structural strength of the second end of the first strap 11 can be improved to allow the second end of the first strap 11 to slide stably within the accommodating cavity.

On the basis of the above embodiment, the first limiting structure 211 is provided within the accommodating cavity and is located on the second side of the drive gear 61. To avoid contact between the first limiting portion 112 and the drive gear 61, the first limiting structure 211 is spaced apart from the drive gear 61 along the direction of movement of the first strap 11; both the first limiting structure 211 and the drive gear 61 are located in the through hole, and the first limiting portion 112 is located on a side of the first limiting structure 211 away from the drive gear 61.

Exemplarily, a bottom wall of the battery compartment 21 is provided with a limiting baffle, the limiting baffle is located between the drive gear 61 and the first limiting portion 112, and the limiting baffle is capable of contacting with the fourth side wall. In an embodiment, a contact surface between the limiting baffle and the fourth side wall can be a flat surface to improve a contact effect.

For example, the limiting baffle can be a rectangular plate, one end of the limiting baffle is fixed to the bottom wall of the battery compartment 21 and the other end thereof can protrude from a surface of the first strap 11, and the limiting baffle can be provided parallel to the fourth side wall and smaller than the fourth side wall in width to allow the first strap 11 to slide smoothly relative to the limiting baffle.

In the embodiment of the present disclosure, the knob 70 is rotated in a preset direction to cause the drive gear 61 to drive the first strap 11 and the second strap 12. When the first limiting portion 112 contacts the first limiting structure 211, a portion of the second end of the first strap 11 inside the accommodating cavity is decreased and a portion of the second end of the first strap 11 outside the accommodating cavity is increased, that is, an adjustable length of the first strap 11 outside the housing 20 is increased and the adjustable length is maximized.

As shown in FIG. 7, a second end of the second strap 12 in an embodiment of the present disclosure is provided with an open slot to form a second chute 121, the second strap 12 includes two opposite and parallel strips 123 that enclose to form the open slot, and a gap between the two strips 123 forms the second chute 121, and a width of the gap between the two strips 123 is greater than the width of the wire 50 so that the wire 50 can be accommodated in the open slot to avoid interference when the wire 50 meets the second strap 12.

Furthermore, the second rack 63 is selectively provided on a side wall of one strip 123; or the second rack 63 is structured integrally with one strip 123, that is, transmission teeth are made on the one strip 123 to form the second rack 63. The second rack 63 can be provided opposite to the first rack 62 and both of them are each meshed with the drive gear 61. An end of each strip 123 is separately provided with a limiting pillar to form the second limiting portion 122. For example, one end of the limiting pillar can be vertically connected to a top surface of the strip 123, and the other end thereof extends in a direction vertical to the direction of movement of the second strap 12, that is, the limiting pillar extends in the same direction as an axial direction of the drive gear 61.

Correspondingly, the housing 20 is internally provided with a second limiting structure 212 that cooperates with the limiting pillar, the second limiting structure 212 can be a limiting lug provided within the housing 20, and limiting lug can be provided on a side wall of the battery compartment 21 and the limiting lug is located in a movement path of the second strap 12 so as to enable the limiting pillar to abut against the limiting lug.

A limiting groove is provided on a side of the limiting lug toward the limiting pillar, and when the second strap 12 is moved along the first side toward the second side, the limiting pillar can be moved to the limiting lug and further embedded into the limiting groove to allow the limiting pillar to abut against the limiting lug, that is, the above second limiting portion 122 abuts against the second limiting structure 212. At this time, a portion of the second end of the second strap 12 inside the accommodating cavity is reduced and a portion thereof outside the accommodating cavity is increased, that is, an adjustable length of the second strap 12 outside the housing 20 is increased and the adjustable length is maximized.

Figure 8:
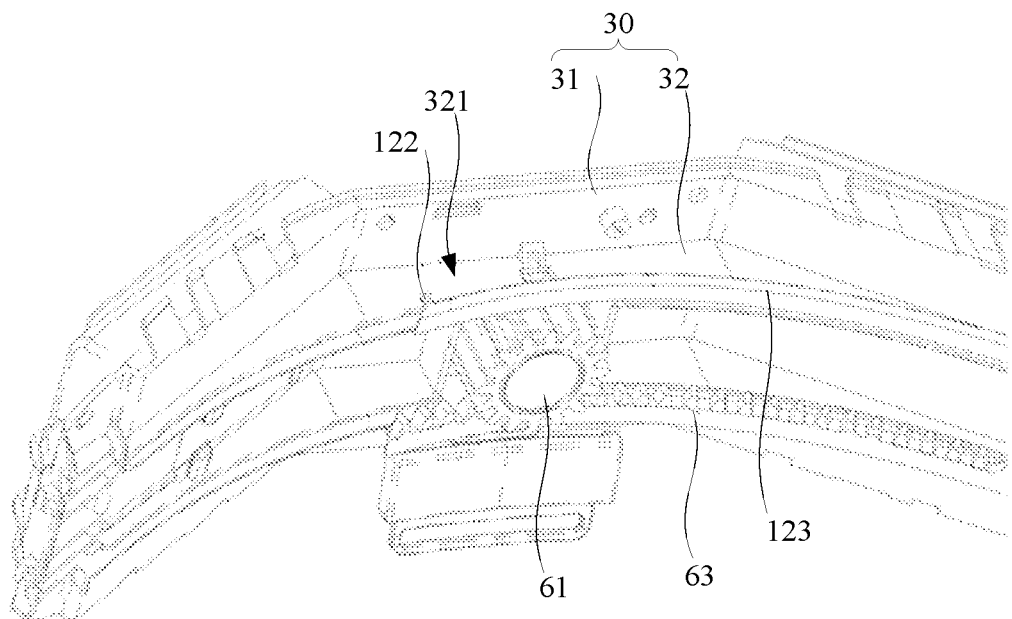
FIG. 8 is a schematic diagram of fitting installation of a guide surface of a battery assembly and a second limiting portion provided in an embodiment of the present disclosure.

As shown in FIG. 8, the housing 20 provided by the embodiment of the present disclosure is further provided with a guide surface 321, the guide surface 321 is provided in cooperation with the limiting pillar so that the limiting pillar may slide on the guide surface 321 during movement of the second strap 12, and thus two strips 123 are kept in a parallel state to reduce a transmission resistance between the drive gear 61 and the second rack 63 and to improve a mechanical transmission effect.

Specifically, the battery assembly 30 in this embodiment includes a main plate 31 and two opposite guide ribs 32, where the two guide ribs 32 are located on a side of the main plate 31 toward the accommodating cavity, tops of the guide ribs 32 are connected to the main plate 31, the guide ribs 32 extend vertically towards the bottom wall of the battery compartment 21, and side surfaces of the guide ribs 32 are used to form the guide surface 321.

A space area between the two guide ribs 32 are opposite to the first chute 111 and the second chute 121, respectively. Surfaces of the two guide ribs 32 facing each other are first surfaces of the guide ribs 32, and the other surfaces of the two guide ribs 32 are second surfaces thereof. After the battery assembly 30 is installed to the battery compartment 21, the second surfaces of the guide ribs 32 can be attached to the limiting pillar to move the limiting pillar along the guide surface 321. Under the limitation of the two guide ribs 32, the two strips 123 of the second strap 12 can be kept parallel, preventing the two strips 123 from interfering with each other and thus avoiding affecting the mechanical transmission effect.

It is to be noted that a side wall of the battery compartment 21 fixed by the limiting lug in the embodiment of the present disclosure is close to the first surfaces of the guide ribs 32, that is, a side wall of the battery compartment 21 on which the limiting lug is located and the limiting pillar are located on opposite sides of the guide ribs 32, respectively, and thus the guide ribs 32 are also provided with a via hole to allow a portion of the limiting lug to pass through and be out of the via hole, and a portion of the limiting lug protrudes out of the guide surface 321 of the guide ribs 32 so that the limiting pillar, when sliding on the guide surface 321, can abut against the limiting lug.

The embodiments or implementations in this specification are described in a step-by-step manner, each embodiment focuses on the differences from other embodiments, and the same or similar portions between various embodiments can be cross-referenced.

It should be noted that references in the specification to "an embodiment", "embodiments", "an exemplary embodiment", "some embodiments", etc. indicate that the embodiment that is referred to can include particular feature, structure or characteristic. However, not every embodiment can include that particular feature, structure, or characteristic. Moreover, such phrases may not necessarily refer to the same embodiment. Furthermore, in describing a particular feature, structure, or characteristic in combination with an embodiment, the realization of such a feature, structure, or characteristic in combination with explicitly or not explicitly described other embodiment is within the scope of knowledge of the skilled in the art.

In general, terms should be understood, at least in part, by their use in context. For example, based at least in part on the context, the term "one or more" as used in the text can be used to describe any feature, structure or characteristic in the singular sense, or can be used to describe a combination of features, structures or characteristics in the plural sense. Similarly, based at least in part on the context, terms such as "a" or "the" can also be understood as conveying singular usage or as conveying plural usage.

It should be easily understood that the terms "on . . . ", "above . . . " and "over . . . " in the present disclosure should be interpreted in a broadest manner so that "on . . . " means not only "directly on something", but also "on something" with an intermediate feature or layer therebetween, and "above . . . " or "over . . . " includes not only the meaning of "above" or "over" something, but also the meaning of "above" or "over" something without an intermediate feature or layer therebetween (i.e., directly on something).

Finally, it should be noted that the above embodiments are used only to illustrate the technical solutions of the present disclosure and not to limit them; although the present disclosure has been described in detail with reference to the previous embodiments, the ordinary skilled in the art should understand that it is still possible to make modifications to the technical solutions recited in the previous embodiments or to make equivalent replacements of some or all of the technical features therein; and these modifications or replacements do not make the essence of corresponding technical solutions depart from the scope of the technical solutions of the embodiments of the present disclosure.

The invention claimed is:

1. A head-mounted virtual reality apparatus, comprising: a display device, a battery compartment assembly, a first strap, a second strap, a wire, and a strap adjustment mechanism;
    wherein the battery compartment assembly comprises a housing, the strap adjustment mechanism is provided in the housing, the strap adjustment mechanism comprises a drive gear, a first rack and a second rack, the first rack and the second rack are meshed with the drive gear and opposite to each other;
    a first end of the first strap and a first end of the second strap are connected with both sides of the display device, respectively; a second end of the first strap and a second end of the second strap are laminated within the housing;
    the second end of the first strap has a first chute and the first rack is provided on a side wall of the first chute; the wire is configured to connect the display device and part of the wire is gathered on a first side of the housing;
    the second end of the second strap has a second chute, the second chute has an open slot opposite to the wire, an extension direction of the open slot is consistent with an extension direction of the second chute;
    the second rack is provided on a side wall of the open slot, and the wire is located within the open slot, and thus the second end of the second strap on the first side of the housing does not meet the wire when the drive gear is rotated.

2. The head-mounted virtual reality apparatus according to claim 1, wherein the drive gear is centrally provided within the housing;
    the second end of the first strap is located on a second side of the drive gear, the second end of the second strap is located on a first side of the drive gear, and the second ends of both them have a variable overlapping area.

3. The head-mounted virtual reality apparatus according to claim 2, wherein the housing is provided with a first limiting structure and a second limiting structure;
    the first strap is provided with a first limiting portion, and when the first strap is configured such that the first limiting portion abuts against the first limiting structure, the first strap is located at its longest length;
    the second strap is provided with a second limiting portion, and when the second strap is configured such that the second limiting portion abuts against the second limiting structure, the second strap is located at its longest length.

4. The head-mounted virtual reality apparatus according to claim 3, wherein the first limiting structure is a limiting baffle provided within the housing;
    along an extension direction of the first chute, the limiting baffle is provided within the first chute, located on the second side of the drive gear and spaced apart from the drive gear.

5. The head-mounted virtual reality apparatus according to claim 4, wherein the second strap is provided above the first strap and slides relative to the first strap.

6. The head-mounted virtual reality apparatus according to claim 3, wherein the second end of the first strap is provided with a through hole along its length direction to form the first chute;
    a portion between the first chute and the second end of the first strap forms the first limiting portion, and the first limiting portion is located on the second side of the drive gear.

7. The head-mounted virtual reality apparatus according to claim 6, wherein the through hole is a rectangular hole; the through hole comprises a first side wall, a second side wall, a third side wall and a fourth side wall opposite to each other, wherein the first side wall and the second side wall are provided opposite to each other along the length direction of the first strap, and the wire is located between the first side wall and the second side wall;
    the first rack is located on the first side wall or the second side wall, the third side wall and the fourth side wall are provided opposite to each other and connected between the first side wall and the second side wall, wherein the fourth side wall is located on the second side of the drive gear and forms the first limiting portion.

8. The head-mounted virtual reality apparatus according to claim 7, wherein the second strap is provided above the first strap and slides relative to the first strap.

9. The head-mounted virtual reality apparatus according to claim 6, wherein the second strap is provided above the first strap and slides relative to the first strap.

10. The head-mounted virtual reality apparatus according to claim 3, wherein the second strap includes two strips for forming the open slot;
    the two strips are provided opposite and parallel to each other, the wire is located between the two strips, and the second rack is located on one of the two strips; each strip is provided with a limiting pillar to form the second limiting portion.

11. The head-mounted virtual reality apparatus according to claim 10, wherein the housing is provided with a limiting lug to form the second limiting structure;

the limiting lug is located in a path of movement of the second strap, the limiting lug is provided with a limiting groove which cooperates with the limiting pillar.

12. The head-mounted virtual reality apparatus according to claim 11, wherein the housing is further provided with a guide surface opposite to each strip;

one end of the limiting pillar is connected to the strip, and the other end of the limiting pillar extends to the guide surface and slides along the guide surface.

13. The head-mounted virtual reality apparatus according to claim 12, wherein the battery compartment assembly further comprises a battery assembly;

the housing has a battery compartment and the limiting lug is provided on a side wall of the battery compartment;

the battery assembly is provided within the battery compartment and forms an accommodating cavity together with a bottom wall of the battery compartment, the first limiting structure and the second limiting structure are both provided within the accommodating cavity.

14. The head-mounted virtual reality apparatus according to claim 13, wherein the battery assembly comprises a main plate and two oppositely provided guide ribs;

one sides of the guide ribs are connected to the main plate, the other sides thereof extend toward the bottom wall of the battery compartment, and one side surfaces of the guide ribs form the guide surface, the guide surface is attached to the limiting pillar;

the guide ribs are provided with a via hole to cooperate with the limiting lug, and part of the limiting lug passes through the via hole and abuts against the limiting pillar.

15. The head-mounted virtual reality apparatus according to claim 13, wherein the battery compartment assembly further comprises a battery cover and a knob;

the battery cover is covered on the housing and seals the battery compartment;

the knob is rotationally connected to the battery cover and one end of the drive gear passes through the battery assembly and is connected to the knob.

16. The head-mounted virtual reality apparatus according to claim 13, wherein both sides of the housing are provided with a first opening and a second opening, respectively;

the second end of the first strap and the second end of the second strap extend through the first opening and the second opening, respectively, into the accommodating cavity, and are connected with a portion of the drive gear located within the accommodating cavity.

17. The head-mounted virtual reality apparatus according to claim 16, wherein a portion of the wire is integrated within the first strap and a portion of the wire is exposed outside of the first strap;

a first end of the wire is connected to the display device, and a second end of the wire is provided in a curled form in the accommodating cavity, and the second end of the wire is connected to a side of the battery assembly near the battery cover.

18. The head-mounted virtual reality apparatus according to claim 3, wherein the second strap is provided above the first strap and slides relative to the first strap.

19. The head-mounted virtual reality apparatus according to claim 2, wherein the second strap is provided above the first strap and slides relative to the first strap.

20. The head-mounted virtual reality apparatus according to claim 1, wherein the second strap is provided above the first strap and slides relative to the first strap.

* * * * *